United States Patent Office 3,655,824
Patented Apr. 11, 1972

3,655,824
RUBBERY ACRYLIC RESIN COMPOSITION CONTAINING A RESINOUS 4,4'-DIOXY DIARYLALKANE POLYCARBONATE
Tetsuji Kato, Mikio Izumi, Yuji Hayashibara, and Kazuo Suenaga, Hiroshima, Japan, assignors to Mitsubishi Rayon Company, Ltd., Tokyo, Japan
No Drawing. Filed July 21, 1970, Ser. No. 56,943
Claims priority, application Japan, July 31, 1969, 44/59,964
Int. Cl. C08g *39/10*
U.S. Cl. 260—873        13 Claims

ABSTRACT OF THE DISCLOSURE

A resinous composition which comprises the admixture of: 5 to 95%, by weight of a resinous composition selected from the group consisting of a resinous polymer prepared by graft polymerizing 40–100% by weight of at least one monomeric vinyl aromatic hydrocarbon and 60–0%, by weight of an ethylenic comonomer, with a rubbery polymer formed from 50–100%, by weight of at least one monomer selected from the group consisting of alkyl acrylate and alkyl methacrylate, each containing between 1–18 carbon atoms in the alkyl group, and 50–0%, by weight, of an ethylenic comonomer, and a resinous polymeric mixture prepared by admixing a polymer formed by polymerizing from 40–100% by weight of at least one monomeric vinyl aromatic hydrocarbon and 60–0%, by weight of an ethylenic comonomer with a graft polymer prepared by graft polymerizing 40–100%, by weight of said monomeric vinyl aromatic hydrocarbons and 60–0%, by weight, of said ethylenic comonomer with a rubbery polymer formed from 50–100%, by weight of at least one monomer selected from the group consisting of alkyl acrylate and alkyl methacrylate, each containing between 1–18 carbon atoms in the alkyl group, and 50–0%, by weight, of an ethylenic monomer, and 95–5%, by weight of a 4,4'-dioxy diarylalkane polycarbonate resin.

BACKGROUND OF THE INVENTION

Field of the invention

This invention relates to a novel thermoplastic resinous composition which is superior in impact strength and which is resistant to crazing and weathering. The composition comprises a resinous polymer containing an acrylate polymer and an alkane polycarbonate polymer.

Description of the prior art 4,4'-dioxydiarylalkane polycarbonate resin (hereinafter referred to "polycarbonate") is similar to styrene-acrylonitrile resin (hereinafter referred to AS resin), as far as refractive index is concerned. A mixture of these two resins shows some improved properties, however such a mixture has a pearl-like gloss and hence the use of this mixture is limited to specialty purposes.

The polycarbonate is able to mix well with acrylonitrile-butadiene styrene resin (hereinafter referred to ABS resin). And a mixture of these two resins is characterized by high impact strength and high crazing resistance. However, this mixture is inferior in weathering resistance.

SUMMARY OF THE INVENTION

The present inventors have now found that a resinous composition which is tough and has superior crazing resistance and weathering resistance is obtained by mechanically mixing at various rates a resinous polymer containing a rubber acrylate polymer, which is superior in weathering resistance, and a polycarbonate.

According to the present invention, a composition is provided, which comprises a resinous polymer (A) containing an acrylate polymer, and (B) a polycarbonate. The polymer (A) is made from (a) a rubbery polymer containing mainly at least one compound selected from the group consisting of alkyl acrylates and alkyl methacrylates, the alkyl group of which contain from 1–18 carbon atoms, and (b) an aromatic hydrocarbon homopolymer or copolymer formed from monomeric aromatic hydrocarbons and monomeric vinyl or vinylidene compound. The polymer (A) is obtained by polymerizing at least a portion of the monomers for the polymer (b) in the presence of polymer (a).

DESCRIPTION OF PREFERRED EMBODIMENTS

A mixture of 5–95% by weight of polymer (A) and 95–5% by weight of polycarbonate (B) is most preferable. When the quantity of polycarbonate (B) is less than 50% by weight, the mechanical strength, heat resistance and moldability of the polymer (A) will be improved, whereas if the quantity of polycarbonate (B) is greater than 50% by weight, the impact strength and crazing resistance of the polycarbonate (B) will be improved. If the quantity of polycarbonate (B) is 50% by weight, an improvement will be expected in impact strength, heat resistance and crazing resistance.

Polymer moiety (A)

This polymer is made from a rubbery polymer (a) in which the alkyl acrylate and/or the alkyl methacrylate are predominant, wherein said alkyl group containing 1–18 carbon atoms and (b) a homopolymer of an aromatic hydrocarbon or a copolymer of an aromatic hydrocarbon and a monomeric vinyl or vinylidene compound.

This polymer is prepared by polymerizing at least a portion of the monomers for the polymer moiety (b) in the presence of the rubbery polymer (a). In a first method all of the monomers for polymer (b) is polymerized in the presence of polymer (a). This is known as graft polymerization. In a second method known as graft-blend, a portion of the monomers for polymer (b) is polymerized in the presence of polymer (a) to prepare a graft polymer (c). The remaining portion of the monomers for polymer (b) is separately polymerized in the absence of the polymer (a) to prepare new polymers (d). Polymers (c) and (d) are mixed together.

In a third alternative method referred to as two-stop graft, a portion of the monomers for polymer (b) is polymerized in the presence of polymer (a) to prepare a graft polymer (e). The remaining portion of the monomers for the polymer (b) is then polymerized in the presence of polymer (e).

It is preferred that the rubbery moiety be present in an amount of 5–40% by weight.

Rubbery acrylate polymer (a)

This polymer is prepared from 50–100% by weight of at least one compound selected from the group consisting of acrylates and methacrylates, and 0–50% by weight of an ethylenic comonomer. The acrylates are represented by the following formula,

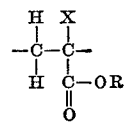

wherein X is a hydrogen atom or a methyl group, and R stands for $C_1$–$C_{18}$ alkyl groups. The acrylates amount to preferably 70% by weight or more, most preferably 80% or more.

The ethylenic comonomer is a vinyl compound. It includes aromatic vinyl hydrocarbons, such as, for example, styrene; vinyl cyanides such as, for example, acrylonitrile; and aliphatic vinyl esters, such as, for example, vinyl acetate.

Typical polymers are polybutylacrylate and copolymers of butyl acrylate (99–80%) and methyl methacrylate, butyl methacrylate or acrylonitrile (1–20%). Cross-linked polymers are preferable wherein the secondary transition temperature is preferably 0° C. or less and the degree of swelling in methylethyl ketone at 30° C. is 400–1200%. Cross-linking is effected by adding organic peroxides, such as, for example, benzoyl peroxide and/or 10 wt. percent or less of polyfunctional monomer such as divinyl benzene, ethylene dimethacrylate, triallylcyanurate and triallylphosphate.

Polymer (b)

Polymer (b) is a homopolymer or copolymer formed from 40–100% by weight of an aromatic vinyl hydrocarbon such as, for example, styrene and α-methyl styrene, and 60–0% by weight of at least one monomeric vinyl or vinylidene compound. Suitable vinyl of vinylidene compounds include vinyl cyanides such as acrylonitrile, methacrylonitrile or the like, or its alkyl derivatives, such as methyl methacrylate, methyl acrylate or the like, or their derivatives or halogenated compounds such as vinyl chloride or the like.

Preferable examples are polystyrene, copolymers of styrene (70–99%) and acrylonitrile (1–30%), and terpolymers of styrene (40–90%)-acrylonitrile (5–30%)-methyl methacrylate (5–30%).

Polycarbonate moiety (B)

Polycarbonate of 2,2'-(4,4'-dihydroxy-diphenyl)-propane is typical. It is prepared by introducing phosgene into a caustic alkaline aqueous solution of 4,4'-dioxydiarylpropane in the presence of a solvent, or interesterifying between 4,4'-dioxydiarylpropane and a diester of carbonic acid in the presence of a catalyst. Polycarbonates of (4,4' - dihydroxy-diphenyl)-methane; 1,1 - (4,4'-dihydroxy-diphenyl)-cyclohexane; 2,2 - (4,4' - dihydroxy-diphenyl)-butane; 2,2-(4,4' - dihydroxy-diphenyl)-pentane; 2,2-(4,4'-dihydroxy-diphenyl)-hexane and 2,2-(4,4'-dihydroxy-diphenyl)-heptane may also be used.

The polymer moieties (A) and (B) are mixed to prepare the present composition. As stated above, (A) is preferably 5–95% by weight and (B) is 95–5% by weight. Either of the moieties (A) or (B) may be in the form of pellets or a melt and may be added to the others in the form of melt and mixed thoroughly. Alternatively, both (A) and (B) may be in the form of pellets and are mixed and then melted. In this case, at least one of the two may be in the form of a powder.

Lubricants, stabilizers, pigments and/or inorganic and organic fibrous or non-fibrous materials may be added, if necessary.

Third components may be added if desired such as, for example, polyethylene resins, polyvinyl chloride resins and polymethylmethacrylate resins.

EXAMPLES 1–4

(1) Two parts of benzoyl peroxide was dissolved at 15° C. in a mixture of 180 parts of butyl acrylate and 20 parts of methyl methacrylate (parts are referred to by weight, as long as not otherwise specified). The solution was added to 400 parts of ion-exchanged water into which 5 parts of dioctylsulfosuccinate (trade name "Pelex OTP" produced by Kao Atlas Co., Ltd., Japan) as an emulsifying agent, and a redox initiator composed of 0.7 part of potassium persulfate and 0.35 part of sodium hydrogen sulfite had been dissolved. Aqueous dispersion was kept at 35° C. for 5 hours to polymerize the monomers. An additional 3 parts of the emulsifying agent was dissolved therein. The dispersion was left to stand at 90° C. for 5 hours to carry out the cross-linking reaction, until rubbery polymer (a) was obtained. Degree of conversion was 98.8%. Insoluble gel in methylethyl ketone was contained as much as 94.5% and swelling degree was 10.5%.

$$\text{Gel content} = W_2/W_0 \times 100\%$$

$$\text{Swelling degree} = W_1 - W_2/W_2 \times 100\%$$

where $W_0$: initial weight,
$W_1$: weight after a sample is dipped in methylethylketone in an amount of about 150 times as much as the sample, and it is left to stand at 30° C. for 24 hours, and
$W_2$: weight after $W_1$ is absolutely dried.

600 parts of the rubber polymer (a) latex (polymer content: 200 parts) were added into deionized water (800 parts). A mixture of styrene (300 parts) and acrylonitrile (100 parts), where benzoyl peroxide (2 parts) was dissolved, was added drop by drop over about 3 hours to the latex. The latex was kept at 70° C. for 2 hours, until a polymer was produced. Degree of conversion was 99.5%.

(2) 750 parts of styrene, 250 parts of acrylonitrile, 3 parts of potassium persulfate, 20 parts of dioctylsulfosuccinate, 2000 parts of deionized water and 4 parts of laurylmercaptan were allowed to react in a nitrogen atmosphere at 60° C. for 3 hours and then at 75° C. for 1 hour, until a polymer was obtained. Degree of conversion was 100% and intrinsic viscosity [$\eta$] in dimethylformamide at 25° C. was 1.0.

(3) Polymers obtained in (1) and (2) above were mixed so that the acrylic elastomer was in an amount of 25% by weight. It was stirred at room temperature for 1 hour, and then coagulated in a 0.05% aqueous solution of aluminium chloride. It was filtered, washed with water, and dried in vacuum at 60° C. Resinous polymer (A) was obtained.

(4) The resinous polymer (A) was mixed with polycarbonate (trade name "Iupilon S–2000," produced by Mitsubishi Edogawa Kagaku Co., Ltd., Japan) at various ratios using a V-type blender. The mixture was extruded at about 270° C. by a bent extruder (40ϕ) to produce pellets. These pellets were moulded into test pieces by means of an injection moulding apparatus (screw type). Table 1 shows characteristic properties observed.

TABLE 1

|  | Control polymer (A) | Example 1 | Example 2 | Example 3 | Example 4 | Control (polycarbonate) |
|---|---|---|---|---|---|---|
| Polymer (A) (percent by weight) | 100 | 90 | 80 | 50 | 20 | 0 |
| Polycarbonate (percent by weight) | 0 | 10 | 20 | 50 | 80 | 100 |
| Melt index (g./10 min.) (230° C., 3.8 kg. load) | 0.5 | 0.8 | 1.4 | 3.6 | 3.4 | 2.9 |
| Heat distortion temperature (° C.) after annealed (ASTM D–648–56) (12.7×127×6.4 mm., 18.6 kg./cm.²) | 96 | 97 | 99 | 105 | 134 | 140 |
| Tensile strength (kg./cm.²) (ASTM D–638–58T) (Type 1 dumb-bell, 3.2 mm. thick) | 440 | 460 | 470 | 540 | 630 | 710 |
| Izod impact strength (kg. cm./cm.²) (12.7×64×6.4 mm., V notched) | 4 | 4 | 4 | 15 | 66 | 12 |
| Crazing resistance* (12.7×100×3.2 mm., 200 kg./cm.²) | ○ | ○ | ○ | ○ | △ | X |

* Test piece is loaded so that the max. fiber stress at the center is 200 kg./cm.² and filter paper impregnated with CCl₄ is allowed in contact with the center.

NOTE.—X=Broken immediately; △=Cracked, but not broken; ○=Not changed.

Table 1 shows that the resinous polymer (A) is improved in melt index as well as tensile strength, by incorporating a small amount of polycarbonate. That melt index and impact strength are remarkably higher than those of polycarbonate alone can be noted, when polycarbonate is contained in an amount of 50% or more.

Table 2 shows that dynstatt impact strength of the composition of the present invention is compared with those of a polycarbonate-ABS resin mixture and of a polycarbonate-AS resin mixture. Exposure test was conducted by use of WE-2 type Weather-o-meter produced by Toyo Rika Kogyo Co., Ltd., Japan.

was filtered and washed with water, the residue was dried in vacuo at 60° C., to obtain powdery resinous polymer (A').

(4) Powdery resinous polymer (A') was mixed with various amounts of powdery polycarbonate (trade name "Iubilon S-2000," produced by Mitsubishi Edogawa Kagaku Co., Ltd.) in a Henschel Mixer. The mixtures were fused and mixed well by means of a bent extruder (40φ) at 250° C. to produce a variety of pellets. Test pieces were formed by use of a screw type injection moulding apparatus (5 oz.). Characteristic properties of the pieces are listed in Table 3.

TABLE 3

|  | Control [polymer (A')] | Example | | | | | | | Control (polycarbonate) |
| --- | --- | --- | --- | --- | --- | --- | --- | --- | --- |
|  |  | 5 | 6 | 7 | 8 | 9 | 10 | 11 |  |
| Resinous polymer (A') (percent by weight) | 100 | 90 | 80 | 70 | 60 | 40 | 20 | 10 | 0 |
| Polycarbonate (percent by weight) | 0 | 10 | 20 | 30 | 40 | 60 | 80 | 90 | 100 |
| Melt index (g./10 min.) (230° C., 21.6 kg. load) | 58 | 59 | 65 | 60 | 48 | 43 | 20 | 16 | 14 |
| Heat distortion temperature (°C.) annealed (12.7×127×6.4 mm., 18.6 kg./cm.²) | 90 | 99 | 101 | 103 | 105 | 122 | 134 | 138 | 140 |
| Tensile strength (kg./cm.²) (Type 1 dumb-bell, 3.2 mm. thick) | 400 | 450 | 470 | 480 | 500 | 540 | 550 | 600 | 710 |
| Izod impact strength (kg. cm./cm.²) (12.7×64×6.4 mm., V notched) | 4.5 | 10 | 10 | 35 | 54 | 65 | 70 | 65 | 15 |
| Crazing resistance (12.7×100×3.2 mm., 200 kg./c.²) | O | O | O | O | O | O | Δ | Δ | X |

TABLE 2

|  | Example | | | Control |
| --- | --- | --- | --- | --- |
|  | 2 | 3 | 4 |  |
| Polymer (A) | 80 | 50 | 20 | |
| Polycarbonate | 20 | 50 | 80 | 20 | 80 |
| ABS resin |  |  |  | 80 |  |
| AS resin |  |  |  |  | 20 |
| Crazing resistance | O | O | Δ | O | X |
| Dynstatt impact strength (kg.cm./cm.²): |  |  |  |  |  |
| Before exposure | (1) | (1) | (1) | (1) | (1) |
| After 400 hours exposure | 20 | 80 | (1) | 12 | 10 |
| Change of appearance after 400 hours exposure | (2) | (2) | (2) | (3) | (4) |

¹ Not broken.
² A little discolored.
³ Yellowed.
⁴ A little yellowed.

Appearance of the present composition is better than that of an ABS polycarbonate when exposed and deterioration in impact strength is less, even when polycarbonate is in an amount of 20%. This means that the present composition is very useful as materials for cold forming which requires high weather resistance.

EXAMPLES 5–11

(1) A vessel was charged with 180 parts of butylacrylate, 12 parts of methyl methacrylate, 8 parts of ethylene dimethacrylate, 1 part of triallylcyanurate and 5 parts of "Pelex OTP." The vessel was filled with nitrogen. Ion-exchanged water (400 parts) saturated with nitrogen was heated to 65° C. and then 1 part of an initiator (potassium persulfate) was dissolved. Immediately after the dissolution, the contents of the vessel were added drop by drop over 1 hour and 50 minutes to the water. Then, polymerization was continued for 40 minutes to obtain latex of rubbery polymer (a). Solid content was 32.4%, swelling degree was 7.0% and size of rubber particles was 0.3μ.

(2) 600 parts of latex of rubbery polymer (a) (solid=200 parts) and 1200 parts of deionized water were mixed and air in a vessel was replaced with nitrogen before heating to 65° C. A mixture of monomers (100 parts) hereinunder mentioned and benzoylperoxide (3 parts) was added thereto and further the same monomers (500 parts) were added drop by drop over 3 hours and 50 minutes. The monomers consisted of styrene-acrylonitrile-methylmethacrylate (60:20:20). After the addition was completed, polymerization was effected for about 40 minutes to obtain graft polymer. Degree of conversion was 99.8%, and intrinsic viscosity (25° C., in dimethylformamide) of resin extract by use of methylethylketone was 0.82.

(3) After the polymer latex thus obtained was stirred at room temperature for 1 hour, it was coagulated in a 0.05% aqueous solution of aluminum chloride. After it Table 3 shows that particularly Izod impact strength of a mixture of resinous polymer (A') and polycarbonate is remarkably higher than that of respective polymer alone.

EXAMPLE 12

(1) One part of benzoyl peroxide was dissolved in a mixture of 90 parts of butyl acrylate and 10 parts of acrylonitrile. The solution was added to 200 parts of deionized water into which 2.5 parts of an emulsifying agent (trade name "Pelex OTP," produced by Kao Atlas Co., Ltd.) and a redox initiator composed of 0.3 part of potassium persulfate and 0.15 part of sodium hydrogen sulfite had been dissolved. The solution was kept at 35° C. for 5 hours. Subsequently, adidtional 0.5 part of the emusifying agent was dissolved therein. The solution was left to stand at 90° C. for 5 hours to carry out the reaction, until rubbery polymer was obtained. Degree of conversion was 99%, and swelling degree in methylethylketone was 11%.

300 parts of latex of the rubbery polymer (a) (polymer content was 100 parts) was added to 60 parts of deionized water. To the latex was added and polymerized drop by drop over about 1 hour at 65° C. a mixture of 30 parts of styrene and 10 parts of acrylonitrile, wherein 0.2 part of benzoyl peroxide had been dissolved. Subsequently, the latex was kept at 70° C. for 2 hours to complete the reaction to obtain a polymer. Degree of conversion was 99%.

(2) 495 parts of styrene, 165 parts of acrylonitrile, 2.5 parts of potassium persulfate, 10 parts of Pelex OTP, 1000 parts of deionized water and 2 parts of laurylmercaptan were allowed to react in nitrogen atmosphere at 60° C. for 3 hours and then at 75° C. for 1 hour to obtain a polymer having intrinsic viscosity (η) of 0.8.

(3) The polymer obtained respectively in (1) and (2) above were mixed together so that the latex elastomer content was in an amount to 12.5% by weiht. The mixture was coagulated in a 0.05% aqueous aluminum chloride solution and dried in vacuum at 60° C. to obtain resinous polymer (A).

(4) 60 parts of the resinous polymer (A), 40 parts of polycarbonate, 0.2 part of barium stearate, 0.2 part of liquid paraffin and 0.2 part of a ultraviolet absorber (trade name "Tinuvin P," produced by Geigy) of benzotriazol type were mixed together by means of a Henschel mixer. Thereafter, the mixture was pelletized by means of an extruder (40φ). The pellets were molded into a test piece by means of a screw type injection molding apparatus (5 oz.). The test piece was determined to obtain characteristic properties thereof as listed in Table 4.

EXAMPLE 13

(1) 300 parts of the same rubbery polymer (a) latex (polymer content was 100 parts) as obtained in Example 12 was treated in the same manner as in (1) of Example 12 except that 40 parts of styrene was added drop by drop to the system in place of the monomer mixture to conduct the polymerization.

in place of 100 parts of the butyl acrylate. Characteristic properties of the test piece from the desired composition obtained are listed in Table 4.

TABLE 4

| | Example | | | |
|---|---|---|---|---|
| | 12 | 13 | 14 | 15 |
| Acrylate rubber | BuA/AN | BuA/AN | BuA | BuA/BMA. |
| Composition of acrylate rubber (percent by weight) | 90/10 | 90/10 | 100 | 90:10. |
| Cross-linking agent | BPO:1 part | BPO: 1 part | TAC:1 part | TAC:1 part. |
| Rubber content (percent) | 12.5 | 12.5 | 33 | 33. |
| Composition of resin | AN/St (25/75) | St (100) | MMA/AN/St (30/20/50) | MMA/AN/St (30/20/50). |
| Resinous polymer (A) (percent by weight) | 60 | 60 | 60 | 60. |
| Polycarbonate (percent by weight) | 40 | 40 | 40 | 40. |
| Melt index (g./10 min.) (230° C. 21.6 kg.) | 49 | 55 | 70 | 65. |
| Heat distortion temperature (° C.) annealed (12.7×127×6.4 mm. 18.6 kg./cm.²) | 108 | 105 | 99 | 101. |
| Tensile strength (kg./cm.²) (No. 1 dumb-bell of 3.2 mm. in thickness) | 600 | 580 | 500 | 510. |
| Izod impact strength (kg.cm./cm.²) (12.7×64×6.4 mm. V notched) | 20 | 15 | 50 | 45. |
| Crazing resistance (12.7×100×3.2 mm., 200 kg./cm.²) | 0 | 0 | 0 | 0. |

NOTE.—In the above table, symbols represent as follows: BuA=Butyl acrylate; AN=Acrylonitrile; BMA=Butyl methacrylate; BPO=Benzoyl peroxide; TAC=Triallylcyanurate; St=Styrene; MMA=Methyl methacrylate.

(2) 660 parts of styrene was polymerized in the same manner as in Example 12 to obtain a polystyrene having intrinsic viscosity ($\eta$) of 0.9.

(3) The polymers obtained respectively in (1) and (2) above were blended together to obtain resinous polymer (A) having rubber content of 12.5% by weight.

(4) The resinous polymer (A) was treated according to the same procedure as in (4) of Example 12 to obtain a composition which was then molded into a test piece. Characteristic porperties of the piece are shown in Table 4.

EXAMPLE 14

(1) 100 parts of butyl acrylate, 1 part of triallylcyanurate and 2.5 parts of an emulsifying agent, "Pelex OTP," were mixed together. Separately, 0.5 part of potassium persulfate, an initiator, was dissolved in 200 parts of deionized water and the solution was heated to 65° C. Immediately thereafter, the mixture obtained above was added dropwise to the latter solution to polymerize, where the addition was conducted at that temperature over about 2 hours. Then the polymerization was further effected for 40 minutes to obtain a latex of rubbery polymer. Swelling degree of the rubber was 900%.

(2) 300 parts of the rubbery latex (polymer content was 100 parts) obtained in (1) above and 600 parts of deionized water were mixed together and the mixture was heated to 65° C. Separately, 1 part of benzoyl peroxide as an initiator was dissolved in 40 parts out of 200 parts of a mixture comprising 100 parts of styrene, 60 parts of methyl methacrylate and 40 parts of acrylonitrile. The mixture was poured in the heated latex and 160 parts of the remaining monomer mixture was added thereto drop by drop over 2 hours and 30 minutes to polymerize. After the addition was over, the polymerization was conducted for 40 minutes more to obtain a polymer. Degree of Conversion was 99.5%, intrinsic viscosity ($\eta$) of the resin as extracted using methylethylketone was 0.88.

(3) After the latex of resinous polymer thus obtained was stirred at room temperature for 1 hour, it was coagulated in a 0.05% aqueous aluminum chloride solution. There was prepared a resinous polymer having a rubber content of 33%.

(4) 60 parts of the resinous polymer thus obtained was mixed in a Henschel mixer with 40 parts of polycarbonate, 0.2 part of white oil, 0.2 part of an antioxidant (trade name, "Antage W 300," produced by Kawaguchi Chemical Co., Ltd., Japan). The mixture was then pelletized and the pellets were molded into a test piece by means of a screw type injection molding apparatus (5 oz.). Characteristic properties of the piece are set forth in Table 4.

EXAMPLE 15

Example 14 was repeated except that 90 parts of butyl acrylate and 10 parts of butyl methacrylate were used

What we claim is:

1. A resinous composition which comprises the admixture of:
   (A) 5 to 95%, by weight of a resinous composition selected from the group consisting of:
      (1) a resinous polymer prepared by graft polymerizing 40–100% by weight of at least one monomeric vinyl aromatic hydrocarbon and 60–0% by weight of an ethylenic comonomer, with a rubbery polymer formed from 50–100% by weight of at least one monomer selected from the group consisting of alkyl acrylate and alkyl methacrylate, each containing between 1–18 carbon atoms in the alkyl group, and 50–0% by weight of an ethylenic comonomer, and
      (2) a resinous polymeric mixture prepared by admixing a polymer formed by polymerizing from 40–100% by weight of at least monomeric vinyl aromatic hydrocarbon and 60–0% by weight of an ethylenic comonomer with a graft polymer prepared by graft polymerizing 40–100%, by weight of said monomeric vinyl aromatic hydrocarbons and 60–0% by weight of said ethylenic comonomer with a rubbery polymer formed from 50–100% by weight of at least one monomer selected from the group consisting of alkyl acrylate and alkyl methacrylate, each containing between 1–18 carbon atoms in the alkyl group, and 50–0% by weight of an ethylenic comonomer, and
   (B) 95–5% by weight of a 4,4'-dioxy diarylalkane polycarbonate resin.

2. The composition of claim 1 wherein said rubbery polymer is prepared from 70–100% by wt. of an alkyl acrylate containing 1–8 carbon atoms in said alkyl group, and 30–0% by wt. of at least one comonomer selected from the group consisting of styrene, methyl methacrylate, acrylonitrile and butyl methacrylate.

3. The composition of claim 2 wherein said graft polymers is prepared by polymerizing 95–60% by wt. of said monomers in contact with 5–40% by wt. of said rubbery polymer.

4. The composition of claim 1 wherein said monomers used in preparing said graft polymer comprise 40–100% by wt. of at least one monomer selected from the group consisting of styrene and methylstyrene and 60–0% by wt. of at least one comonomer selected from the group consisting of acrylonitrile, methyl methacrylate, methyl acrylate and vinyl chloride.

5. A resinous composition of claim 1 wherein said comonomer used in preparing said graft polymer is styrene.

6. A resinous composition of claim 1 wherein said comonomers used in preparing said graft polymer is a mixture of 70–99% by wt. styrene and 1–30% by wt. acrylonitrile.

7. A resinous composition of claim 1 wherein said comonomers used in preparing said graft polymer is a mixture of 40–90% by wt. styrene, 5–30% by wt. acrylonitrile and 5–30% by wt. methyl methacrylate.

8. A resinous composition according to claim 1 wherein the rubbery polymer (a) is polybutyl acrylate.

9. A resinous composition according to claim 1 wherein the rubbery polymer (a) is a polymer of a mixture of 99–80% by weight of butyl acrylate and 1–20% by weight of methyl methacrylate.

10. A resinous composition according to claim 1 wherein the rubbery polymer (a) is a polymer of a mixture of 99–80% by weight of butyl acrylate and 1–20% by weight of acrylonitrile.

11. A resinous composition according to claim 1 wherein the rubbery polymer (a) has swelling degree of 400–1200% in methylethylketone 30° C.

12. A resinous composition according to claim 1 wherein the rubbery polymer (a) is cross-linked with at least one polyfunctional monomer selected from the group consisting of divinyl benzene, ethylene dimethacrylate, triallylcyanurate and triallylphosphate.

13. A resinous composition according to claim 4 wherein the polycarbonate (B) is polycarbonate of 2,2'-(4,4'-dihydroxy-diphenyl)-propane.

References Cited

UNITED STATES PATENTS

| | | | |
|---|---|---|---|
| 3,461,187 | 8/1969 | Cantrill | 260—873 |
| 3,162,695 | 12/1964 | Grabowski | 260—873 |
| 3,130,177 | 4/1964 | Grabowski | 260—873 |
| 3,041,307 | 6/1962 | Baer | 260—881 |

WILLIAM H. SHORT, Primary Examiner

E. WOODBERRY, Assistant Examiner

U.S. Cl. X.R.

260—876 R, 881, 882, 885